Feb. 2, 1960 W. A. BISHMAN 2,923,347
CIRCUMFERENTIALLY TRAVELING-TYPE TIRE CHANGING DEVICE
Filed June 29, 1956 3 Sheets-Sheet 1

INVENTOR.
WALTER A. BISHMAN
BY
ATTORNEY

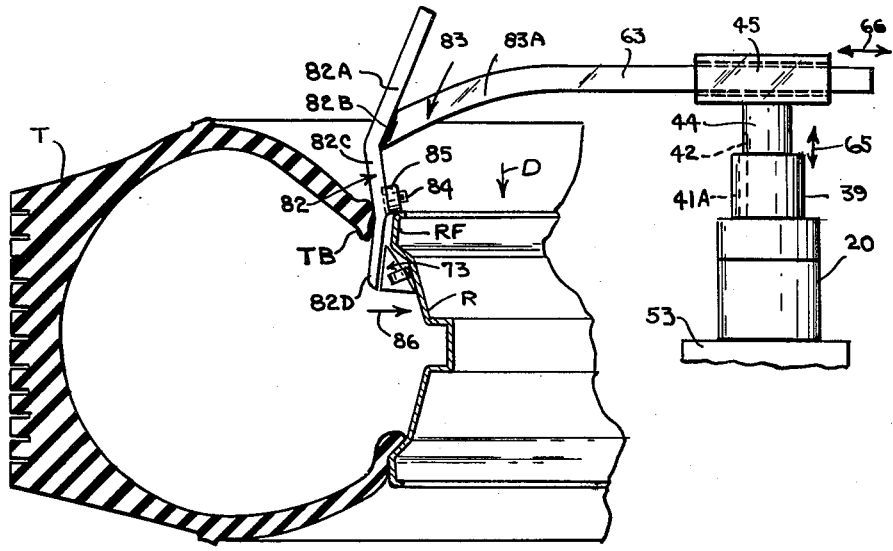
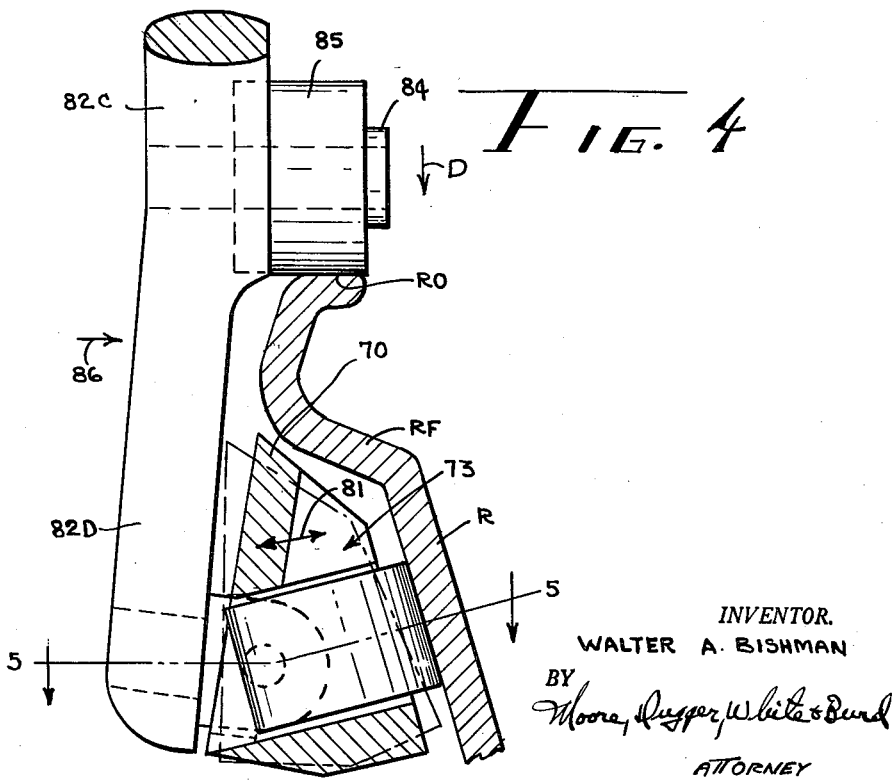

INVENTOR.
WALTER A. BISHMAN
BY Moore, Hugger, White & Burd
ATTORNEY

United States Patent Office 2,923,347
Patented Feb. 2, 1960

2,923,347

CIRCUMFERENTIALLY TRAVELING TYPE TIRE CHANGING DEVICE

Walter A. Bishman, Minneapolis, Minn., assignor to Bishman Manufacturing Company, Osseo, Minn., a corporation of Minnesota Application June 29, 1956, Serial No. 594,931

9 Claims. (Cl. 157—1.24)

This invention relates to devices for changing tires, that is, for mounting and demounting tires on and off wheel rims. More particularly, this invention relates to improvements and devices for changing tubeless tires, especially large, heavy tires such as are used on trucks and buses.

The mounting and demounting of tires by hand is an arduous task. For the most part, the rims of modern tires are of one piece construction and in order to mount or demount the tire, it is essential that the bead of the tire (which has a smaller diameter than the flanges of the rim upon which it is mounted) be forced over the rim at one point and then utilizing the resiliency the bead and tire side wall gradually work the bead over balance of the rim. Devices have been developed to assist an operator in changing tires by providing means for holding the rim and mechanically rotating a tire changing tube around the rim for deforming the bead and tire side wall sufficiently so as to permit it to be brought up over the rim and out of disengagement with the rim.

Large forces are required to displace the bead and side wall of the tire, for the purpose of moving it outwardly in respect to the rim. In the normal hand or mechanically operated tire changing machines, the bead is first engaged manually with a "tire tool" for separating the bead slightly to the rim at one point, whereupon, another tool is inserted into the space between the bead and rim. Then, while the bead is held deflected manually at one place, the inserted tool is rotated concentrically in respect to the tire-rim assembly and in so doing moves the bead radially from the rim and at the same time forces the bead up over the rim. In such devices, a great force is produced in a radial direction and in the manual or machine operated devices, such forces have been taken by the framing of machine on which the rim is mounted. All rims are not exactly concentric and the force may vary at different radial positions around the bead.

It is an object of the present invention to provide an improved tire changer wherein the force in a radial direction required for deflecting the bead and moving it outwardly over the rim, is taken on the rim itself. It is another object of the invention to provide an improved machine, wherein a tool is rotated radially in respect to the rim-tire assembly but is held in a radial position in respect to the rim by suitable contact with the rim. It is another object of the invention to provide improved machine tire changer wherein a tool is mounted for sliding movement radially in respect to the rim with which it is used, but is held against displacement in such radial direction by rolling contact with the rim itself. It is also an object of the invention to provide an improved tire changer capable of being used with nonconcentric or rough rims upon which tires are mounted. Other objects are those inherent in the invention and discovery hereof.

To the accomplishment of the foregoing related ends, this invention then comprises features hereinafter fully described and particularly pointed out in the claims, the following description setting forth in detail illustrative embodiments of the invention, these being indicative, however, of but a few of the various ways in which the principles of the invention may be employed. The invention will be made clear with reference to the drawings, wherein Figure 1 is a plan view partly sectioned illustrating a mechanically operated tire changing machine embodying the improvements of the present invention;

Figure 3 is a fragmentary vertical, sectional view of a rim and tire and tire changing tool which tool component forms an element of the invention described;

Figure 4 is a much enlarged fragmentary vertical sectional view of the tire changing tool of Figure 3, the portion sectioned being taken along the line and in the direction of arrow 4 of Figure 5;

Throughout the drawings, corresponding numerals refer to the same parts.

Figure 1:
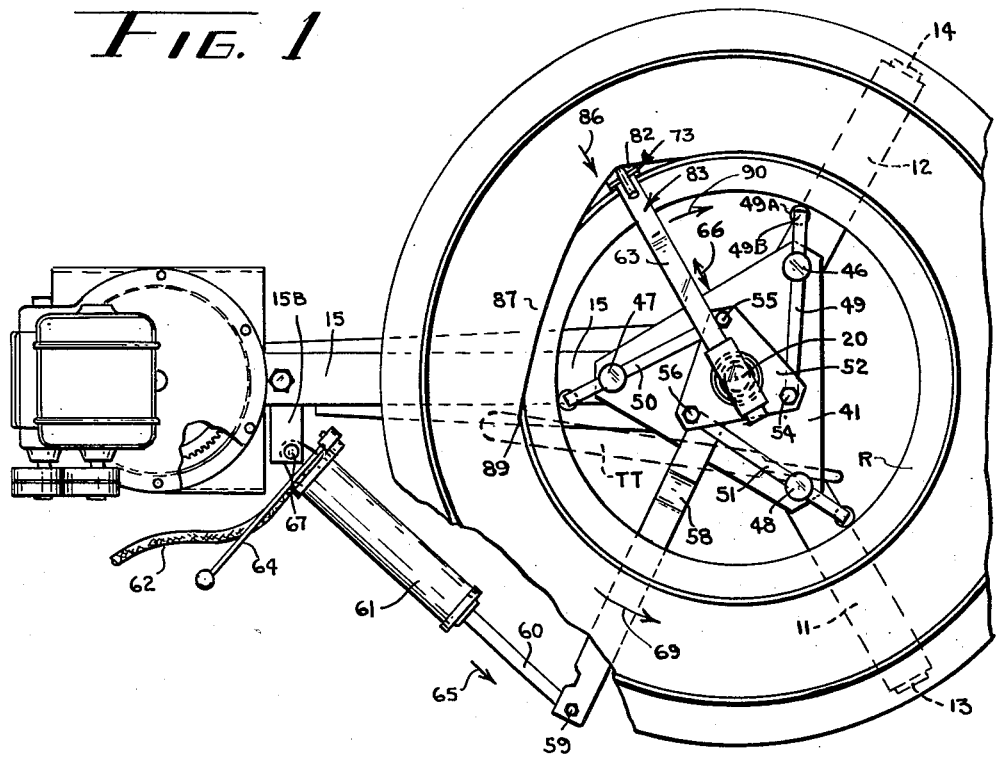
Figure 2:
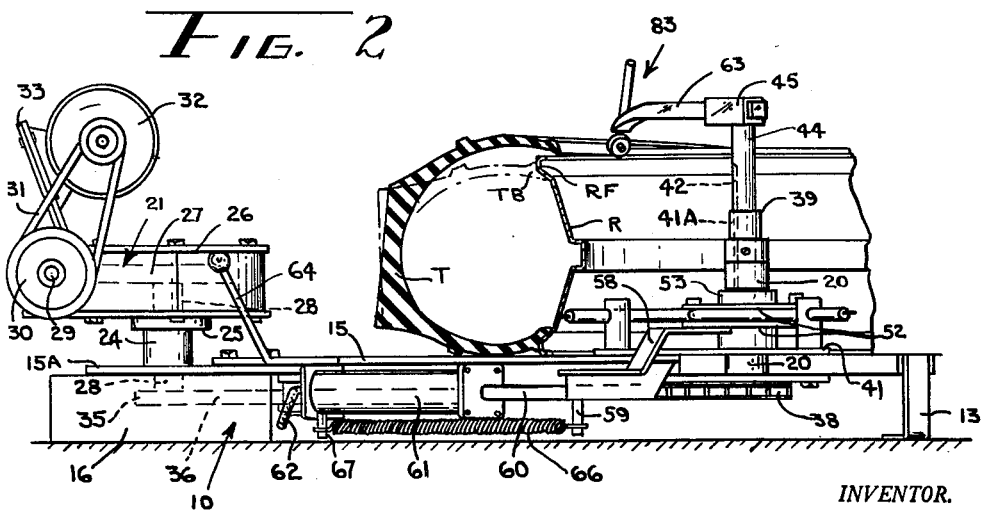
Figure 2 is a side elevation view, corresponding to Figure 1, that portion of Figure 2 which illustrates the tire and the rim being sectioned and the balance of the view being a side elevation.
Figure 5:
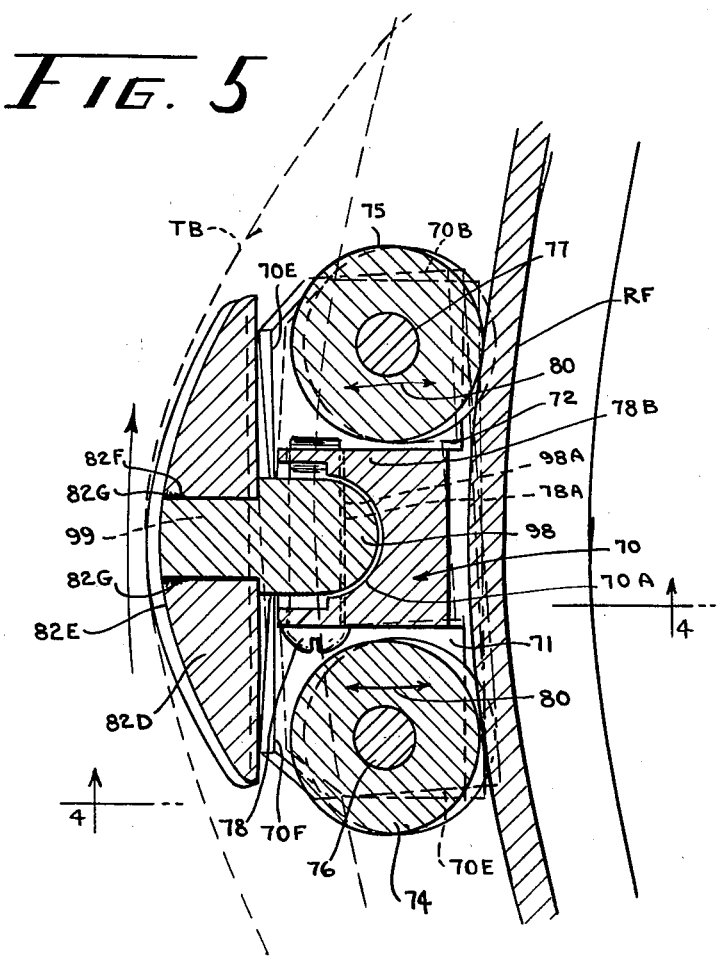
Figure 5 is a horizontal sectional view corresponding to Figure 4 and taken along the lines and in the direction of arrows 5—5 in Figure 4.
Figure 6:
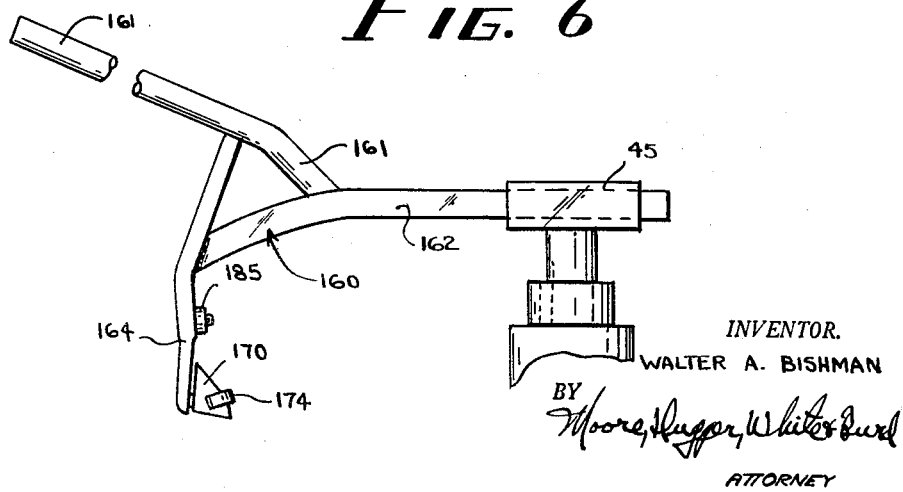
Figure 6 is a vertical side elevational view of a somewhat modified form of the invention intended for manual operation.

It may be stated in general that the improvements of the present invention and discovery may be utilized on tire changers which are actuated manually or by power, such as electric motor. In Figures 1 and 2 of the drawings there is illustrated a tire changer of the power operated type where the power is provided by an electric motor thru suitable gearing. Figures 3–4–5 illustrate in greater detail, the construction of the tire-rim engaging instrumentality by which the tire bead is separated from the rim. These views may be regarded as illustrating the construction used whether or not the machine is manually or power operated. Figure 6 shows a side elevation of a tire-rim engaging instrumentality which is intended specifically for manual operation.

In tire changers, as contemplated by the present invention, whether they be of the manually operated or power operated type, provision is made for approximate centering and holding the rim of the tire-rim assembly in a firm condition so that it cannot rotate and in a position approximately centered in respect to a pivotal mounting for the tire-rim tool. The particular mechanically operated tire changer as illustrated in Figure 1 is the one shown and claimed in my copending application entitled "Tire Changer" filed June 4, 1956, Ser. No. 589,317, but it will be understood that the improvements of the present invention may be used with any style of mechanical or mechanically operated or power operated tire changer. As the tire changer upon which the present invention is an improvement is described with particularity in the aforesaid application, it will be reviewed only briefly here, but it will be understood that said prior application aforementioned, is incorporated herein by reference.

The tire changer hereof is comprised of a base, generally designated 10 forming a longitudinal backbone, which is composed of the portions 11 and 12 at one end and portion 15 at the other end. Portions 11 and 12 have floor engaging feet at 13 and 14. Portions 11, 12 and 15 are fastened together and extend in generally radial directions from hollow tube 20, the main frame member 15 being extended considerably beyond the tire, so as to form a mounting at 15A for the power drive. In this instance, the portion of a frame 15A is supported by a box 16 which forms feet of the same height as 13 and 14 under the frame 15. The space under the frame 11—12—15 is sufficient to house the mechanical drive from the power mechanism generally designated 21 and a rotating tubular shaft 39 which journalled in the center 20. In this instance, the power mechanism has a bearing support 24, which is provided at 25 with a flange upon which a gear box 26 is mounted. The gear box has a worm gear at 27, mounted upon the shaft 28 and another mating gear on the shaft 29 (not shown) rotates the gear 27 and the shaft 28. This is a customary form of worm gear drive and is completely enclosed so as to permit adequate lubrication. Upon the shaft 29 there is a pulley 30 which is driven thru belt 31 from an electric motor 32, the motor being mouted on a frame 33 so that the belt may be adjusted to requisite tightness. When the motor 32 rotates, the shaft 28 is, in consequence, likewise rotated at slow speed and rotates a chain sprocket 35 which is keyed to the lower end of the shaft 28. The chain sprocket 35 is connected by a suitable roller chain 36 to another larger chain sprocket at 38 which is mounted upon the lower end of the hollow shaft 39 supported in the journal 20. The journal 20 and frame pieces 11, 12 and 15 are welded to a generally triangular plate 41 which rests upon the three main frame legs 11, 12 and 15 and thru which the journal 20 passes. The hollow spindle 39 is accordingly rotated whenever the motor 32 rotates but the speed of rotation of spindle 39 is very slow and a powerful torque can be exerted by the spindle 39. In the spindle 39 is a key, illustrated in dotted lines at 41A which mates with a keyway 42 in a shaft 44. The shaft 44 is made so that it is free to slide vertically within the hollow spindle 39 but rotates with the shaft due to the cooperative action of the key 41A and the key way 42. To the top of the shaft 44 there is welded a hollow tubular perch 45 which accordingly rotates whenever the motor 32 is rotated. Perch 45 is non-circular, here illustrated so that the similarly shaped radial shank 63 of the tire tool generally designated 83 will not turn therein.

Upon the plate 41, there are mounted three pivot rods 46, 47 and 48, each being journalled in plate 41. The rods 46, 47 and 48 are cross drilled at the top so that they can slideably receive rods 49, 50 and 51. The shafts 46—48 are mounted on the triangular plate 41 so as to be capable of slight rotation and the inner ends of each of the rods 49, 50 and 51 extends between a pair of smaller triangular plates 52 that are welded to a tube 53 which is rotatably received upon the outside of journal 20. The triangular plates 52 are spaced apart just enough to receive the inner ends of the rods 49, 50 and 51 and a pivot connection is made from each shaft to plates 52 by a suitable pin or bolt as at 54, 55 and 56. To the lower plate 52 there is attached an outwardly and downwardly extending side lever arm 58, which is pivotally attached by the bolt 59 to a piston rod 60 which works in the air cylinder 61. The cylinder 61 is supplied with compressed air by the hose line 62 and the air is controlled by an "on" and "exhaust" valve operated by lever 64, which in one position admits air to the cylinder 61 and pushes the rod 60 in the direction of arrow 65, and in the other position exhausts the air from the cylinder. When exhaust occurs, a spring at 66 which is attached at one end to the pivot 59 and at the other end to the pivot 67 on the frame will cause the piston rod to be moved in a direction opposite to the arrow 65. The bolt 67 forms a pivotal mounting for the base of the cylinder 61 being attached to the frame piece 15B. As a consequence of the operation of the air cylinder, the lever 58 may be caused to move in a counter clockwise direction as illustrated by the arrow 69 whenever air is admitted to the cylinder and when air is exhausted, the lever 58 moves in a clockwise direction. The net result of such counter clockwise movement of lever 58 is that each of the plates 52 is likewise so rotated and their rods 49—51 are caused to move in their pivotal slides 46—48 respectively toward the inner surface of the rim R on which the tire T is mounted. At the outer end of each of the rods 49—51, there is provided a point or instrumentality which will engage upon and secure itself, temporarily at least, to the inner surface of the rim R. In the form shown, each of the rods shown 49—51 is provided with a small roller as at 49A, the roller being sharpened on the edge like a glass-cutter roller, and pivotally mounted as at 49B. The sharp edge of the roller engages the inner surface of the rim but does not slide parallel to the rim axis even though there may be a slope to the rim. Other forms of engaging devices for the ends of rods 49—51 are shown in my copending application, Ser. No. 589,317 filed June 4, 1956, and any of these may be used.

The effect of the simultaneous actuation of the rods 49—51 is that the rim R is first preliminarily centered and then finally held in a position substantially concentric with the axis of journal 20. It will be appreciated that when the tire is to be demounted from the rim, the entire tire rim assembly is dropped onto the frame 11—12—15 where the tire rests against the frame pieces, but as dropped onto the machine by the operator, such tire-rim assembly will not in most instances, be concentric with the axis of journal 20. When the air cylinder 61 is actuated as aforesaid, the first of the rods 49—51 to contact rim R, will cause the rim to be pushed towards centering position, and as another of the rods engages the rim, this action is continued. The two rods will cause the rim to move in a centering direction until finally the third rod will contact the rim. The final movement may require the rollers on the rod ends, as at 49A, to rotate a little relative to the rim so as to accommodate the centering action but they do not slide axially of the rim on the slanted inner surface of the rim and once the engagement of all of the rollers of rods 49—51 is complete, the rim is substantially centered and firmly secured.

The form of the centering device just described is a convenient and economical chucking arrangement but in so far as this invention is concerned, it, and other components of the machine in general, may be replaced by other equivalent elements, so long as the rim and tire is arranged to be held securely substantially concentric with a pivot center, and this must be understood herein.

For removing the tire T from the rim R, the operator will first manipulate the tire bead so as to push the bead away from the rim flange RF and provide a little space into which the tip end of a tire tool TT may be entered in an appropriate direction. The tire tool TT is manipulated manually and when entered sufficiently so as to provide adequate leverage, the bead is deflected away from the rim so as to permit the business end of a mechanical bead engaging tool, generally designated 83, to be settled into the space between the tire bead TB and the rim flange RF. Then the tire tool TT is held as shown in Figure 1 so as to hold the bead from creeping back into place after it has been lifted by the mechanical tool 83. Now great forces are required to separate the tire bead TB radially from the rim flange RF, and here, these forces are based upon the provision of contact between the inner part of the business end of tool 83 and the rim itself.

Referring now to Figures 3–5 the improved tire changer of the present invention utilizes a form of tire engaging tool 83, the shank 63 of which by virtue of the sliding connection at perch 45, is permitted to move freely in a radial direction as shown by double arrow 66 and by virtue of the sliding of shaft 44 in tubular shaft 39, tire tool 83 can also move freely in the direction of double arrow 65. Thus the pushing force by which the tire bead TB is separated from the rim flange RF, derives its support in both the radial and axial direction (in respect to the rim) entirely from the nearest portion of the rim from which the bead is being separated. Thus, as shown in Figures 3–5 the central spindle 44 having the square tubular perch 45 thereon, receives the also square end 63 of tool 83 which reaches radially outwardly from the axis of shaft 44 and then bends down at 83A and is welded to a shoe member 82 which is the business end of 83. The shoe member 82 is relatively flatter stock and extends in a downward and outward direction at 82A then across the junction 82B where it is welded to the radial arm of the tool 83, and then downwardly and somewhat inwardly at 82C and then donwnwardly and somewhat outwardly at 82D. The lower portions 82C and 82D are flat and are rounded off on their outer surface as shown for outer surface 82E in the sectional view Figure 5. The reason for this is to provide as smooth as possible a surface against which the tire bead TB runs as it is being forcibly pushed away from the rim during the operation. It will be observed that due to the mounting of the shaft 44, which is slideable in respect to the hollow spindle 39, the shaft 44 is free to move up and down as shown by the double arrow 65 of Figure 3 and the radial arm 63, is likewise free to move backward and forward radially in respect to the mounting 45 as shown by the double arrow 66. Accordingly, no force other than rotational force (torque) about the axis of shaft 44 is transmitted from spindle 39 thru mounting 45 to the radial arm 63—83.

The support of the radial arm 63—83 against movement radially inwardly is provided by means of a rocker shoe, generally designated 73. At the lower end 82D of the shoe 82, there is provided a pivot mounting 98 which has a semi-spherical inner end and a shank 99 which is positioned in a hole 82F in the shoe. The shank 99 in then welded in firmly as at 82G and the weld is ground off so that the outer surface of the shoe 82D is smooth. Transversely thru the semi-spherical end 98 there is provided a hole at 98A. Upon the semi-spherical end there is positioned a small frame piece generally designated 70 which has a central hole at 70A having a semi-spherical bottom into which the semi-spherical end 98 of the pivot seats. The frame piece 70 extends from the line 70B (Figure 5) to the line 70E and has a front surface 70E—70F which faces the back surface of the shoe 82 at its lower end. This surface 70E—70F is spaced slightly from the adjacent rear surface of the shoe 82 and the entire frame 70 can therefore rock a little so as to accommodate itself to irregularities and lack of concentricity on the rim flange RF. The litttle rocking frame 70 has slots 71 and 72 cut thru its opposite ends and in each of these slots is placed a roller as at 74 and 75, the rollers being journaled upon the pins 76 and 77. Before the rollers are placed, however, there is inserted a screw 78, the shank of which has a diameter at 78A, which is somewhat smaller than the hole 98A. The screw is threaded into the frame 70, at 78B and is therefore held in place even though it could not back out because the roller 74 is in the way. The looseness between the screw shank 78A and the hole 98A of the member 98 is sufficient to permit rocking motion of the frame 70 to take place on the semi-spherical end 98, as aforesaid. It will be appreciated that the rocking motion of the frame 70, which is illustrated by the double arrows 80 of Figure 5 is accommodated in a plane generally perpendicular to the slanted inner surface of the rim R. However, the semi-spherical end 98 will also accommodate additional rocking motion about the axis of the screw 78, in the direction of the arrow 81, of the Figure 4. In Figure 4, the dotted line shows one position to which the frame 70 may rock and the full lines show another position. Similarly in Figure 5 the full line position of the front surface of the frame 70 is shown at line 70E—70F and the rocked positions both ways from this normal position are shown for the same edge in dotted lines. Upon the portion 82C of the shoe, there is provided an inwardly extending spindle 84 upon which there is rotatably mounted a roller 85 which engages the outer surface RO of the rim. This roller is illustrated in Figures 2, 3 and 4. The net effect of the roller support for the shoe 82, is that the shoe 82 will follow around on the rim and it is guided against movement in a downward direction (i.e. in the direction D, Figures 3 and 4) by the contact of the roller 85 against the outer surface R of the rim.

The shoe is held against movement in a radially inward direction, as illustrated by the arrow 86 by the action of the rollers 74—75, rolling against a portion of the rim between the rim flanges which is normally covered by the mounted tire. A similar roller 85 prevents the tool from moving axially (downward in Figures 2, 3 and 4). The shoe 70 will accommodate itself constantly to irregularities, bumps, wobble and lack of concentricity of the rim. The considerable force exerted by the tire bead TB against the shoe 82 may be hundreds of pounds but this force is transmitted directly to the rim R thru rollers 74, 75 and 85, and thru the rim to the rod supports 49—51 and hence to the frame of the machine. None of the forces are transmitted radially or axially thru the arm 63 to the central spindle 44. As the spindle 39 rotates however, the torque force which drives the shoe 82 ahead like a plow constantly lifts the tire bead TB away from the rim flange RF. Since the tire bead is held in one position by the operator, by means of the tire tool TT, the bead is stretched in a more or less straight line, as at 87 in Figure 1 and the stretched bead slants from its normal position upwardly over the shoe 82 and then along the line 87 to the tire tool TT where the bead is held lifted up and above the rim flange RF. The radial arm 63 moves constantly around and soon one half or more of the tire bead TB will have been forced outwardly and upwardly above the rim flange RF and from then on much less forces are encountered as the shoe 82 moves around to complete its one turn about the rim.

For mounting the tire, the procedure is reversed; a tire tool is first inserted and the bead pried down or at least started down at one point adjacent to the shoe 82 which is then rotated. The radial arm 63—83 is normally made to rotate in a clockwise direction as shown by the arrow 90 of Figure 1, although it may be designed to operate in either direction, and as it rotates around, the bead is stretched outwardly beyond the rim flange RF. The operator meanwhile, has held the bead in at least one point in a position depressed inwardly in respect to the rim flange and the combined actuation machine and the operator holding the tire bead at one place will cause the bead to be deflected out and slide down so as to snap over the rim in accompaniment of the rotation of the machine tool 63—83.

In both mounting and demounting the tires, it is desirable to lubricate the bead with a suitable material.

Referring to Figure 6, there is illustrated a form of tire tool 160 which is in all respects the same as that shown in Figures 1–5 and previously described except a radially upwardly and outwardly extending handle 161 is provided terminating in a hand grip on 62. In this form, a frame 11—12—15 is provided except that no motor 31, gear box 21 and chain and sprocket drive is provided for the tubular shaft 41 but the frame is firmly mounted on the floor and is provided with one or another form of rim centering and holding devices corresponding to the rods 41—51 herein described. In the mechanical form, the rim is thus held and centered with respect to the spindle 44 which is capable of moving up and down and of supporting the shank 162 of the tire tool 160 shown in Figure 6. The only difference in the operation is that here the operator by grasping the radially extending manipulating arm 161 provides the rotational force for tool 160, which, in the modification shown in Figures 1–5, is provided by the motor drive. Otherwise the construction of the tool portion 164, shoe 170, the rollers 174 and 175 (not shown in Figure 6, but corresponding to roller 75 of Figure 5), and the roller 185 are identical with those previously described. The operation is the same both for mounting and demounting except that manual force is utilized for swinging the arm 162 rather than having this force supplied by power devices.

As many apparently widely different embodiments may be made without departing from the spirit and scope thereof, it is to be understood that I do not limit myself to the specific embodiments herein, except as defined by the appended claims.

I claim:

1. A tire changer comprising a frame of low elevation having thereon a journal with an upright axis said frame forming a support on which an assembly of a flanged rim and a beaded tire may be rested in a generally horizontal plane, means on the frame for chucking the rim substantially concentrically in respect to said journal, a shaft rotatably mounted in said journal having perch thereon for receiving a radial tool arm therein for sliding movement toward and away from said journal, said tool arm having at one end a shoe shaped to be inserted between the rim flange and a bead of the tire mounted thereon, roller means pivotally mounted on the shoe for engaging a portion of said rim which is exposed when the tire is mounted on the rim and wheel means on the shoe positioned so as to roll on a portion of the rim which is enclosed by the tire when the tire is mounted on the rim for transferring to the rim the forces produced by the bead of the tire against the shoe.

2. The tire changer of claim 1 further characterized in that upon the shoe is rockably mounted a small frame upon which the wheel means is journalled.

3. The tire changer of claim 2 further characterized in that said wheel means includes at least two wheels journalled in tracking relationship on the small frame and that a load transferring bearing is provided connecting the shoe and the small frame said bearing being situated between the journals of said small wheels and positioned to transfer forces from the shoe to the small frame.

4. A tire changer comprising a frame having a journal thereon, means for holding on the frame an assembly of flanged rim and beaded tire, said assembly being held in a plane normal to the axis of the journal and substantially concentric therewith, a radial arm mounted for rotation about said journal as a centre and for movement radially and axially in respect thereto, a tire removing shoe fixed on said arm and having a portion shaped to be disposed between the flange of the rim and bead of the tire, and stability means on said shoe for holding it and the arm from displacement radially inward in respect to said centre and from displacement parallel to the axis of said journal, said apparatus being further characterized in that the said stability means includes a rocker frame mounted for limited rocking motion in respect to the shoe and in a position between the shoe and the rim, said frame having wheel means thereon for tracking upon a surface of the rim between the frame and axis of said journal.

5. The tire changer of claim 4 is further characterized in that a spherical bearing surface is provided between the rocker frame and shoe.

6. A tire changer comprising a frame having a journal thereon, means for holding on the frame an assembly of a flanged rim and beaded tire, said assembly being held in plane normal to the axis of the journal and substantially concentric therewith, a radial arm mounted for rotation about said journal as a centre and for movement radially and axially in respect thereto, a tire removing shoe fixed on said arm and having a portion shaped to be disposed between the flange of the rim and the bead of the tire and shaped so as to extend into the interior of the tire and adjacent the flange, and stability means mounted on said shoe so as to form a contacting surface engageable against a portion of the rim which is between the rim flanges and normally covered by the tire when the tire is on the rim for holding the shoe and the arm from displacement radially inwardly in respect to said centre, said stability means including a roller positioned to track upon the rim for stabilizing the shoe against movement toward said rim, and holding means on the shoe for contacting an exterior portion of the rim for holding the shoe and the arm from displacement parallel to the axis of said journal.

7. A tire changer comprising a frame, having a journal thereon, means for holding on the frame an assembly of flanged rim and beaded tire, said assembly being held in a plane normal to the axis of the journal and substantially concentric therewith, a radial arm, means on the journal for mounting the radial arm for rotation, a tire removing shoe fixed on said arm and having a portion shaped to be disposed between the flange and the bead of the tire and shaped so as to extend into the interior of the tire and adjacent the flange, means pivotally mounted on said shoe to form contacting surfaces simultaneously engageable against two circumferentially spaced portions of the rim which is between the rim flanges and normally covered by the tire when the tire is on the rim for holding the shoe and arm radially stable regardless of surface irregularities on said portion of the rim, and holding means on a shoe for contacting the exterior portion of the rim for holding the shoe and arm from displacement parallel to the axis of said journal.

8. The tire changer of claim 7 further characterized in that said holding means for contacting the exterior portion of the rim includes roller means pivoted on an axis generally radial in respect to said journal axis and positioned to track upon an exterior edge of the rim, and said pivotally mounted means includes roller means pivoted on the shoe for tracking upon said portion of the rim between its flanges and normally covered by the tire when the tire is on the rim said roller means including a pair of rollers mounted in spaced relationship to contact circumferentially spaced portions of the rim.

9. A tire changer comprising a frame having a journal thereon, means for holding on the frame an assembly of a flanged rim and a beaded tire, said assembly being held in a plane normal to the axis of the journal and concentric therewith, a radial arm mounted for rotation about said journal as a center and for movement radially and axially in respect thereto, a tire removing shoe fixed on said arm and having a portion shaped to be disposed between the flange of the rim and the bead of the tire, holding means mounted on said shoe for contacting an exterior portion of the rim to space the shoe relative to the rim in a direction parallel to the axis of the journal, and stabilizing means acting in cooperation with the holding means for transmitting substantially all the force exerted by the bead on the shoe as the shoe is rotated about the rim including any irregularities formed thereon, said stabilizing means being mounted on the shoe to form a contacting surface engageable against a portion of the rim which is between the rim flanges and normally covered by the tire when the tire is on the rim, said stabilizing means being elongated to be engageable with two circumferentially spaced portions of the rim flange and mounted on the shoe for two-way pivotal movement relative thereto.

References Cited in the file of this patent

UNITED STATES PATENTS

| | | |
|---|---|---|
| 965,076 | Carle | July 19, 1910 |
| 1,352,550 | Singleton | Sept. 14, 1920 |
| 2,378,955 | Teegarden | June 26, 1945 |
| 2,556,024 | Bourdon et al. | June 5, 1951 |
| 2,661,793 | Rockwell | Dec. 8, 1953 |
| 2,695,659 | Athmann | Nov. 30, 1954 |

UNITED STATES PATENT OFFICE
CERTIFICATE OF CORRECTION

Patent No. 2,923,347                                  February 2, 1960

Walter A. Bishman

It is hereby certified that error appears in the printed specification of the above numbered patent requiring correction and that the said Letters Patent should read as corrected below.

Column 1, line 65, for "diplacement" read -- displacement --; column 3, line 14, for "mouted" read -- mounted --; column 4, line 34, for "do no" read -- do not --; column 5, line 10, for "donwn-wardly" read -- downwardly --; line 33, for "in then" read -- is then --; line 47, for "littte" read -- little --; line 57, for the indistinct letter after the numeral "78" read -- A --; same column 5, line 65, for "rock ng" read -- rocking --.

Signed and sealed this 26th day of July 1960.

(SEAL)

Attest:

KARL H. AXLINE
Attesting Officer

ROBERT C. WATSON
Commissioner of Patents